April 21, 1931. W. A. ANDERSON 1,802,304

LAWN MOWER

Filed May 23, 1930

WILLIAM A. ANDERSON.

By Clarence A. O'Brien

Attorney

Inventor

Patented Apr. 21, 1931

1,802,304

UNITED STATES PATENT OFFICE

WILLIAM A. ANDERSON, OF HIGHTSTOWN, NEW JERSEY

LAWN MOWER

Application filed May 23, 1930. Serial No. 455,118.

This invention relates to improvements in lawn mowers, and more particularly to means for automatically adjusting the cutter bar relative to the rotatable reel.

The primary object of the invention resides in a lawn mower attachment in which the cutter bar is yieldingly supported with respect to the reel so as to automatically compensate for any wear therebetween in order that the lawn mower will operate at maximum efficiency at all times, and which permits uncutable objects such as stones, sticks, and the like to pass therebetween to prevent accidental jamming of the reel and dulling of the coacting cutting elements.

Another object of the invention is to provide a spring tension upon the cutter bar, and means for regulating the tension placed thereon.

Another object is the provision of an attachment for lawn mowers of the kind above mentioned which is simple of construction, inexpensive of manufacture, and which may be associated with the present type of hand lawn mowers now in use, without necessitating radical changes in the construction thereof.

With these and other objects in view, the invention resides in certain novel construction, combination and arrangement of parts, the essential features of which are hereinafter fully described, are particularly pointed out in the appended claims, and are illustrated in the accompanying drawings, in which:

Figure 1:
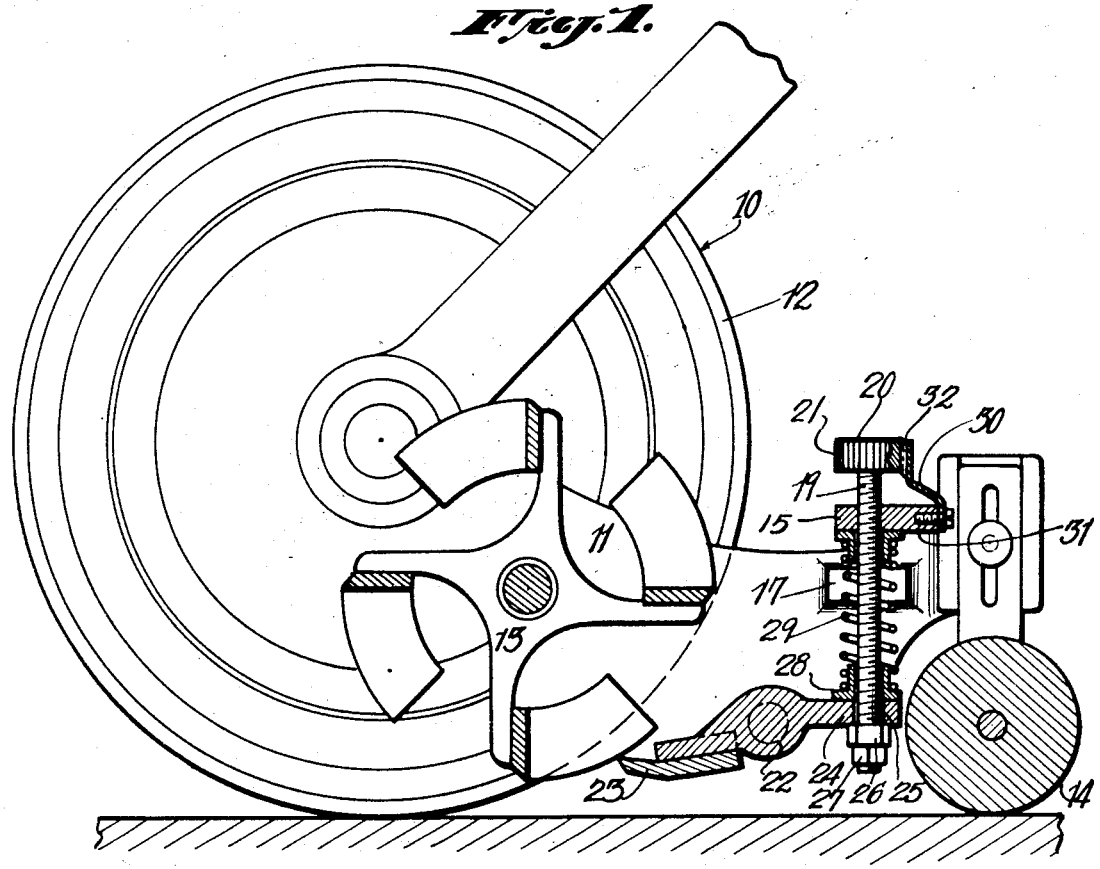
Figure 1 is a fragmentary vertical sectional view through a lawn mower with my improved attachment associated therewith.
Figure 2:
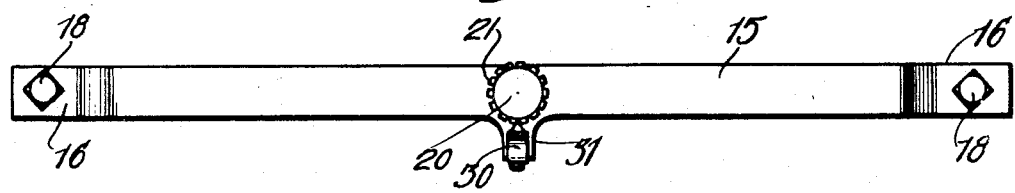
Figure 2 is a detail plan view of the fixed supporting bar per se.
Figure 3:
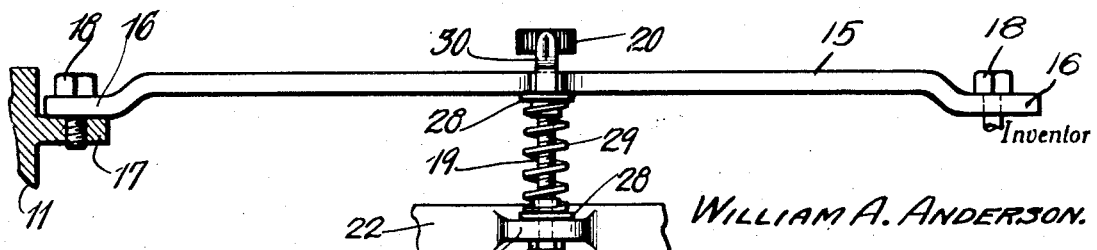
Figure 3 is a side elevational view of the fixed supporting bar, and my improved cutter bar adjusting mechanism.

Referring to the drawings by reference characters, the numeral 10 designates a hand lawn mower of the conventional type which includes a supporting frame structure 11, the ground wheel 12, a rotatable reel 13, and a ground roller 14 journaled at the rearward portion of the frame 11.

Bridging the end walls of the frame 11 rearward of the cutting reel 13 is a cross bar 15, the offset ears 16 at opposite ends thereof resting on inwardly extending lugs 17 provided on the end walls of the frame and secured thereto by bolts or like fastening elements 18. It will be noted that the cross bar 15 is rigid or fixed with respect to the frame 11.

Threaded centrally of the cross bar 15 is a bolt or shaft 19, the same being threaded throughout its length, while the upper end of the bolt or shaft is provided with an annular head 20, the peripheral side wall of which is provided with vertical teeth 21, for a purpose to be presently explained.

Pivoted or journaled in the opposite end walls of the frame 11 rearward of the reel 13 is a cutter bar 22, the front edge of which on one side of its axis has the usual knife blade 23 fixed thereto and which knife blade coacts with the several knife blades of the reel for cutting the grass of a lawn. It is essential in lawn mowers of this type to maintain the knife blade 23 in close proximity to the knife blades of the reel in order that the maximum efficiency of the lawn mower may be obtained. It is therefore my object to yieldably support the knife blade 23 relative to the blades of the reel and which is accomplished by providing a centrally disposed rearwardly extending ear 24 on the cutter bar 22 on that side its axis opposite to that on which the knife blade 23 is mounted. The ear 24 is provided with an opening 25 slightly larger than the external diameter of the screw shaft or bolt 19 and through which opening the said bolt extends, while threaded to the free end of the bolt is a stop nut 26 which is locked against accidental movement by a jamb nut 27 also threaded to the bolt and tightened against the stop nut 26 as best seen in Figure 1 of the drawing.

Slidable upon the threaded bolt 19 and respectively engaging the under side of the cross bar 15, and the upper side of the ear 24 are flanged collars 28—28, while interposed between the collars 28 is an expansion spring 29, which spring tends to depress the cutter bar 22 on one side of its pivotal axis in order to swing the knife blade 23, into operative relation with respect to the knife blade of the reel 13.

From the description thus far, it will be seen that the expansion spring 29 tends to urge the cutter bar into the path of the cutting blades of the reel 13, but movement of the same is arrested or limited by the stop nut 26. By turning the knob or head 20 in opposite directions, the tension of the spring 29 may be increased and decreased, depending upon the degree of tension desired. It will of course be understood that any wear between the knife blade 23 and the blade of the reel 13 may be taken up by the adjustment of the threaded bolt or shaft 19, and the adjustment of the stop nut 26 thereon.

For the purpose of holding the screw shaft or bolt 19 in an adjusted position, I provide a flexible spring catch or pawl 30 which is fixedly attached to a rearwardly extending lug 31 provided on the cross bar 15 centrally thereof. The free end of the spring pawl or catch is provided with a tooth 32 for coacting engagement with the respective teeth 21 on the side of the head 20, and which catch automatically springs into engagement with the teeth as the head 20 is rotated. The tooth 32 is of a length approximating the length of the teeth 21 on the head 20 so as to be capable of engaging the teeth 21 within the range of adjustment of the screw shaft or bolt 19. This catch and coacting teeth 21 on the head 20 tend to prevent any accidental movement of the shaft during use of the lawn mower which might tend to throw the cutter blade 23 out of its proper adjustment.

While I have shown and described what I deem to be the most desirable embodiment of my invention, I wish it to be understood that various changes in construction may be resorted to if desired, and I do not limit myself to the exact details herein shown and described, nor to anything less than the whole of my invention limited only by the appended claims.

Having thus described the invention, what I claim as new and desire to secure by Letters Patent is:—

1. In a lawn mower having a frame, a cutter bar pivoted in said frame, adjustable spring means acting upon said cutter bar to urge the same in one direction, said spring means including a rotatable member, stop means in the path of movement of the cutter bar for limiting the movement of the same against the action of said spring means, and catch means for holding said rotatable member against accidental turning movement.

2. In a lawn mower having a frame, and a cross bar rigid therewith, a cutter bar pivotally mounted in said frame, a screw threaded bolt threaded in said cross bar and freely passing through said cutter bar, an expansion spring interposed between said cross bar and said cutter bar for urging said cutter bar to turn in one direction, and stop means on said bolt in the path of movement of said cutter bar to limit movement of the same against the action of said spring, and catch means for holding said bolt against accidental turning movement.

3. In a lawn mower having a frame, and a cross bar rigid therewith, a cutter bar pivotally mounted in said frame, a screw threaded bolt threaded in said cross bar and freely passing through said cutter bar, an expansion spring interposed between said cross bar and said cutter bar for urging said cutter bar to turn in one direction, stop means on said bolt in the path of movement of said cutter bar to limit movement of the same against the action of said spring, catch means for holding said bolt against accidental turning movement, said catch means including a toothed head provided on said bolt, and a spring pawl engageable with the teeth of said toothed head.

In testimony whereof I affix my signature.

WILLIAM A. ANDERSON.